(12) United States Patent
Sugimoto et al.

(10) Patent No.: US 11,631,923 B2
(45) Date of Patent: *Apr. 18, 2023

(54) BATTERY

(71) Applicant: Panasonic Intellectual Property Management Co., Ltd., Osaka (JP)

(72) Inventors: Yuta Sugimoto, Hyogo (JP); Akihiro Sakai, Nara (JP); Izuru Sasaki, Kyoto (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

This patent is subject to a terminal disclaimer.

(21) Appl. No.: 16/931,136

(22) Filed: Jul. 16, 2020

(65) Prior Publication Data

US 2020/0350627 A1 Nov. 5, 2020

Related U.S. Application Data

(63) Continuation of application No. PCT/JP2018/045586, filed on Dec. 12, 2018.

(30) Foreign Application Priority Data

Jan. 26, 2018 (JP) .............................. JP2018-011528

(51) Int. Cl.
*H01M 50/449* (2021.01)
*H01M 10/0525* (2010.01)
(Continued)

(52) U.S. Cl.
CPC ..... *H01M 50/449* (2021.01); *H01M 10/0525* (2013.01); *H01M 10/0562* (2013.01);
(Continued)

(58) Field of Classification Search
None
See application file for complete search history.

(56) References Cited

U.S. PATENT DOCUMENTS

2014/0193717 A1 7/2014 Harada et al.
2019/0088995 A1 3/2019 Asano et al.

FOREIGN PATENT DOCUMENTS

| JP | 8-222235 | 8/1996 |
| JP | 2006-244734 | 9/2006 |

(Continued)

OTHER PUBLICATIONS

International Search Report of PCT application No. PCT/JP2018/045586 dated Mar. 19, 2019.

(Continued)

*Primary Examiner* — Laura Weiner
(74) *Attorney, Agent, or Firm* — McDermott Will & Emery LLP (57) ABSTRACT

Provided is a battery having further improved charging/discharging efficiency. The battery comprises a positive electrode, a negative electrode, and an electrolyte layer provided between the positive electrode and the negative electrode. The electrolyte layer includes a first electrolyte layer and a second electrolyte layer. The second electrolyte layer is provided between the first electrolyte layer and the negative electrode. The first electrolyte layer includes a first solid electrolyte material. The second electrolyte layer includes a second solid electrolyte material that is a material different from the first solid electrolyte material. The first solid electrolyte material includes Li, M, and X and does not include sulfur. M includes at least one selected from the group consisting of metalloid elements and metal elements other than Li. X is at least one selected from the group consisting of Cl, Br, and I. The reduction potential with regard to lithium of the second solid electrolyte material is lower than the reduction potential with regard to lithium of the first solid electrolyte material.

6 Claims, 2 Drawing Sheets

(51) Int. Cl.
*H01M 10/0562* (2010.01)
*H01M 50/431* (2021.01)
*H01M 50/46* (2021.01)
*H01M 4/02* (2006.01)

(52) U.S. Cl.
CPC ......... *H01M 50/431* (2021.01); *H01M 50/46* (2021.01); *H01M 2004/027* (2013.01); *H01M 2004/028* (2013.01); *H01M 2300/008* (2013.01); *H01M 2300/0094* (2013.01)

(56) References Cited

FOREIGN PATENT DOCUMENTS

| | | | |
|---|---|---|---|
| JP | 5905076 B2 | | 4/2016 |
| JP | 3 043 411 | * | 7/2016 |
| WO | 2013/137224 A1 | | 9/2013 |
| WO | 2018/025582 | | 2/2018 |

OTHER PUBLICATIONS

Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Indian Examination Report dated May 17, 2022 for the related Indian Patent Application No. 202047031568.

* cited by examiner

BATTERY

BACKGROUND

1. Technical Field

The present disclosure relates to a battery.

2. Description of the Related Art

Patent Literature 1 discloses an all-solid battery using a halide including indium as a solid electrolyte.

CITATION LIST

Patent Literature

Patent Literature 1: Japanese Patent Application Publication No. 2006-244734

SUMMARY

In the prior art, further improvement in charge/discharge efficiency of a battery is desired.

The battery according to one aspect of the present disclosure comprises: a positive electrode;

a negative electrode; and an electrolyte layer provided between the positive electrode and the negative electrode, wherein the electrolyte layer includes a first electrolyte layer and a second electrolyte layer;

the second electrolyte layer is provided between the first electrolyte layer and the negative electrode;

the first electrolyte layer includes a first solid electrolyte material;

the second electrolyte layer includes a second solid electrolyte material different from the first solid electrolyte material;

the first solid electrolyte material includes Li, M, and X, and does not include sulfur;

M is at least one selected from the group consisting of metalloid elements and metal elements other than Li, X is at least one selected from the group consisting of Cl, Br, and I; and a reduction potential with regard to lithium of the second solid electrolyte material is lower than a reduction potential with regard to lithium of the first solid electrolyte material.

According to the present disclosure, the charge/discharge efficiency of the battery can be improved.

DETAILED DESCRIPTION OF THE EMBODIMENTS

Hereinafter, embodiments of the present disclosure will be described with reference to the drawings.

First Embodiment

Figure 1:
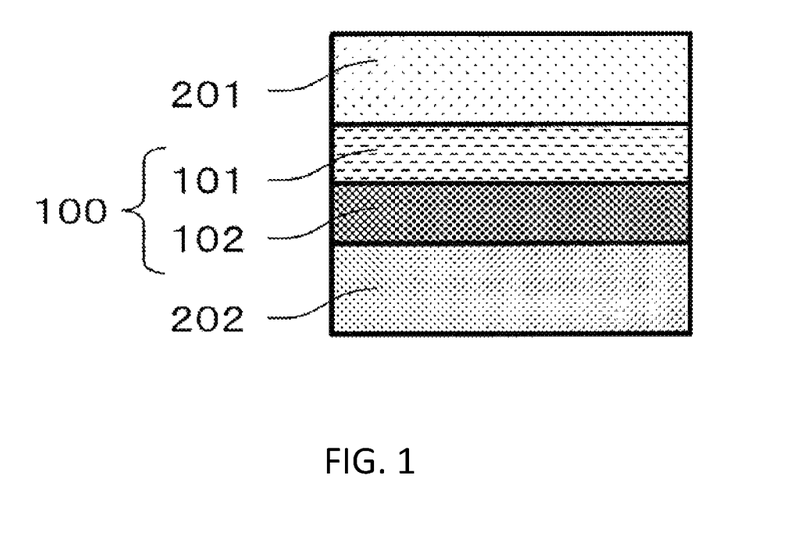
FIG. 1 shows a cross-sectional view of a battery 1000 in a first embodiment.

FIG. 1 is a cross-sectional view showing a schematic configuration of a battery 1000 in the first embodiment.

The battery 1000 in the first embodiment comprises a positive electrode 201, a negative electrode 202, and an electrolyte layer 100.

The electrolyte layer 100 is provided between the positive electrode 201 and the negative electrode 202.

The electrolyte layer 100 includes a first electrolyte layer 101 and a second electrolyte layer 102.

The second electrolyte layer 102 is provided between the first electrolyte layer 101 and the negative electrode 202.

The first electrolyte layer 101 includes a first solid electrolyte material.

The second electrolyte layer 102 includes a second solid electrolyte material. The second solid electrolyte material is a material different from the first solid electrolyte material.

The first solid electrolyte material is a material represented by the following composition formula (1).

$$Li_\alpha M_\beta X_\gamma \qquad \text{Formula (1)}$$

where $\alpha$, $\beta$, and $\gamma$ are each independently a value greater than 0.

M includes at least one selected from the group consisting of metalloid elements and metal elements other than Li.

X is at least one selected from the group consisting of Cl, Br, and I.

The reduction potential with regard to lithium of the second solid electrolyte material is lower than the reduction potential with regard to lithium of the first solid electrolyte material.

By using the second solid electrolyte material having a low reduction potential, reduction of the first solid electrolyte material formed of the halide solid electrolyte having high ionic conductivity is suppressed. Thereby, the charging/discharging efficiency of the battery can be improved.

The term "metalloid element" used in the present specification is at least one selected from the group consisting of B, Si, Ge, As, Sb, and Te.

The term "metal elements" used in the present specification includes (i) all elements included in Group 1 to Group 12 of the Periodic Table (except for hydrogen), and (ii) all elements included in Group 13 to Group 16 of the Periodic Table (except for B, Si, Ge, As, Sb, Te, C, N, P, O, S, and Se).

In other words, each of the metal elements becomes a cation, if each of the metal elements forms an inorganic compound with a halogen compound.

In the composition formula (1), M may include Y (namely, yttrium). In other words, the first solid electrolyte material may include Y as the metal element M.

According to the above configuration, the ionic conductivity of the first solid electrolyte material can be further improved. Thereby, the charge/discharge efficiency of the battery can be further improved.

The first solid electrolyte material including Y may be, for example, a compound represented by a composition formula $Li_a Me_b Y_c X_6$ (a+mb+3c=6 and c>0 are satisfied) (Me: at least one of metalloid elements and metal elements other than Li and Y) (m: valence of Me).

As Me, at least one selected from the group consisting of Mg, Ca, Sr, Ba, Zn, Sc, Al, Ga, Bi, Zr, Hf, Ti, Sn, Ta, and Nb may be used.

According to the above configuration, the ionic conductivity of the first solid electrolyte material can be further improved.

The first solid electrolyte material may be $Li_{2.5}Y_{0.5}Zr_{0.5}Cl_6$.

According to the above configuration, the ionic conductivity of the first solid electrolyte material can be further improved.

The first solid electrolyte material may be a material represented by the following composition formula (A1).

$$Li_{6-3d}Y_dX_6 \qquad \text{Formula (A1)}$$

where, in the composition formula (A1), X is two or more kinds of elements selected from the group consisting of Cl, Br, and I.

In the composition formula (A1), $0<d<2$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A2).

$$Li_3YX_6 \qquad \text{Formula (A2)}$$

where, in the composition formula (A2), X is two or more kinds of elements selected from the group consisting of Cl, Br, and I. In other words, in the composition formula (A1), d=1 may be satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A3).

$$Li_{3-3\delta}Y_{1+\delta}Cl_6 \qquad \text{Formula (A3)}$$

where, in the composition formula (A3), $0<\delta\leq0.15$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A4).

$$Li_{3-3\delta}Y_{1+\delta}Br_6 \qquad \text{Formula (A4)}$$

where, in the composition formula (A4), $0<\delta\leq0.25$ is satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A5).

$$Li_{3-3\delta+a}Y_{1+\delta-a}Me_aCl_{6-x-y}Br_xI_y \qquad \text{Formula (A5)}$$

where, in the composition formula (A5), Me is at least one selected from the group consisting of Mg, Ca, Sr, Ba, and Zn.

In addition, in the composition formula (A5), $-1<\delta<2$;

$0<a<3$;

$0<(3-3\delta+a)$;

$0<(1+\delta-a)$;

$0\leq x\leq 6$;

$0\leq y\leq 6$; and $(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A6).

$$Li_{3-3\delta}Y_{1+\delta-a}Me_aCl_{6-x-y}Br_xI_y \qquad \text{Formula (A6)}$$

where, in the composition formula (A6), Me is at least one selected from the group consisting of Al, Sc, Ga, and Bi.

In the composition formula (A6), $-1<\delta<1$;

$0<a<2$;

$0<(1+\delta-a)$;

$0\leq x\leq 6$;

$0\leq y\leq 6$; and $(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A7).

$$Li_{3-3\delta-a}Y_{1+\delta-a}Me_aCl_{6-x-y}Br_xI_y \qquad \text{Formula (A7)}$$

where, in the composition formula (A7), Me is at least one selected from the group consisting of Zr, Hf, and Ti.

In addition, in the composition formula (A7), $-1<\delta<1$;

$0<a<1.5$;

$0<(3-3\delta-a)$;

$0<(1+\delta-a)$;

$0\leq x\leq 6$;

$0\leq y\leq 6$; and $(x+y)\leq 6$ are satisfied.

According to the above configuration, the ionic conductivity of the first solid electrolyte material can be further improved. Thereby, the charge/discharge efficiency of the battery can be further improved.

The first solid electrolyte material may be a material represented by the following composition formula (A8).

$$Li_{3-2\delta-2a}Y_{1+\delta-a}Me_aCl_{6-x-y}Br_xI_y \quad \text{Formula (A8)}$$

where, in the composition formula (A8), Me is at least one selected from the group consisting of Ta and Nb.

In addition, in the composition formula (A8), $-1<\delta<1;$ $0<a<1.2;$ $0<(3-3\delta-2a);$ $0<(1+\delta-a);$ $0 \leq x \leq 6;$ $0 \leq y \leq 6;$ and $(x+y) \leq 6$ are satisfied.

According to the above configuration, the ionic conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, Li (Al, Ga, In)$X_4$, or $Li_3$(Al, Ga, In)$X_6$ can be used.

The first electrolyte layer 101 may contain the first solid electrolyte material as a main component. In other words, the first electrolyte layer 101 may include the first solid electrolyte material, for example, at a weight ratio of not less than 50% (not less than 50% by weight) with respect to the entire first electrolyte layer 101.

According to the above configuration, the charge/discharge characteristic of the battery can be further improved.

In addition, the first electrolyte layer 101 may include, for example, the first solid electrolyte material at a weight ratio of not less than 70% (not less than 70% by weight) with respect to the entire first electrolyte layer 101.

According to the above configuration, the charge/discharge characteristic of the battery can be further improved.

The first electrolyte layer 101 may further contain inevitable impurities. The first electrolyte layer 101 may include the starting materials used for the synthesis of the solid electrolyte material. The first electrolyte layer 101 may include by-products or decomposition products generated when the solid electrolyte material is synthesized.

The weight ratio of the solid electrolyte material included in the first electrolyte layer 101 to the first electrolyte layer 101 may be substantially 1. "The weight ratio is substantially 1" means that the weight ratio calculated without considering the inevitable impurities that may be included in the first electrolyte layer 101 is 1. In other words, the first electrolyte layer 101 may be composed only of the solid electrolyte material.

According to the above configuration, the charge/discharge characteristic of the battery can be further improved.

As described above, the first electrolyte layer 101 may be composed only of the first solid electrolyte material.

The first electrolyte layer 101 may be positioned without being in contact with the negative electrode 202.

According to the above configuration, the electrochemically stable second electrolyte layer 102 can be inserted between the first electrolyte layer 101 and the negative electrode 202. For this reason, the contact of the first electrolyte layer 101 which is likely to be easily reduced with the negative electrode can be suppressed. As a result, the reduction of the first electrolyte layer 101 can be further suppressed.

As the second solid electrolyte material, for example, a halide solid electrolyte, a sulfide solid electrolyte, an oxide solid electrolyte, or an organic polymer solid electrolyte can be used.

The second solid electrolyte material may be a material represented by the following composition formula (2).

$$Li_{\alpha'}M'_{\beta'}X'_{\gamma'} \quad \text{Formula (2)}$$

where $\alpha'$, $\beta'$, and $\gamma'$ are each independently a value greater than 0.

M' includes at least one selected from the group consisting of metalloid elements and metal elements other than Li.

X' is at least one selected from the group consisting of Cl, Br, and I.

According to the above configuration, the ionic conductivity of the second solid electrolyte material can be further improved. Thereby, the charge/discharge efficiency of the battery can be further improved.

In the composition formula (2), M' may include Y (namely, yttrium).

In other words, the second solid electrolyte material may contain Y as the metal element M'.

According to the above configuration, the ionic conductivity of the second solid electrolyte material can be further improved. Thereby, the charge/discharge efficiency of the battery can be further improved.

The second solid electrolyte material may be $Li_3YCl_6$, $Li_3YBr_6$, or $Li_3YBr_2Cl_2I_2$.

According to the above configuration, the ionic conductivity of the second solid electrolyte material can be further improved. Thereby, the charge/discharge efficiency of the battery can be further improved.

The second electrolyte layer 102 may include the second solid electrolyte material as a main component. In other words, the second electrolyte layer 102 may include the second solid electrolyte material at a weight ratio of, for example, not less than 50% (not less than 50% by weight) with respect to the entire second electrolyte layer 102.

According to the above configuration, the charge/discharge characteristic of the battery can be further improved.

The second electrolyte layer 102 may include the second solid electrolyte material, for example, at a weight ratio of, for example, not less than 70% (not less than 70% by weight) with respect to the entire second electrolyte layer 102.

According to the above configuration, the charge/discharge characteristic of the battery can be further improved.

The second electrolyte layer 102 may further contain inevitable impurities. The second electrolyte layer 102 can include the starting materials used for the synthesis of the solid electrolyte material. The electrolyte layer 102 may include by-products or a decomposition products generated when the solid electrolyte material is synthesized.

The weight ratio of the solid electrolyte material included in the second electrolyte layer 102 to the second electrolyte layer 102 may be substantially 1. "The weight ratio is substantially 1" means that the weight ratio calculated without considering the inevitable impurities that may be included in the second electrolyte layer 102 is 1. In other words, the first electrolyte layer 102 may be composed only of the solid electrolyte material.

According to the above configuration, the charge/discharge characteristic of the battery can be further improved.

The second electrolyte layer 102 may be composed only of the second solid electrolyte material.

The first electrolyte layer 101 and the second electrolyte layer 102 may include two or more kinds of the materials described as the solid electrolyte material.

The total thickness of the first electrolyte layer 101 and the second electrolyte layer 102 may be not less than 1 μm and not more than 300 μm. If the total thickness of the first electrolyte layer 101 and the second electrolyte layer 102 is less than 1 μm, the possibility that the positive electrode 201 and the negative electrode 202 are short-circuited increases. In addition, if the total thickness of the first electrolyte layer 101 and the second electrolyte layer 102 is more than 300 μm, it may be difficult to operate at a high output.

The positive electrode 201 includes a material having a characteristic of storing and releasing metal ions (for example, lithium ions). The positive electrode 201 includes, for example, a positive electrode active material (for example, positive electrode active material particles 211).

Examples of the positive electrode active material include:

lithium-containing transition metal oxides (for example, $Li(NiCoAl)O_2$, $Li(NiCoMn)O_2$, or $LiCoO_2$), transition metal fluorides, polyanion materials, fluorinated polyanion materials, transition metal sulfides, transition metal oxysulfides, and transition metal oxynitrides.

In particular, if a lithium-containing transition metal oxide is used as the positive electrode active material, the cost reduction is performed and an average discharge voltage can be raised.

The positive electrode 201 may include a solid electrolyte material. According to the above configuration, the lithium ion conductivity inside the positive electrode 201 is increased to allow the operation at a high output.

The solid electrolyte material may include a halide solid electrolyte, a sulfide solid electrolyte, an oxide solid electrolyte, a polymer solid electrolyte, or a complex hydride solid electrolyte.

As the halide solid electrolyte, for example, materials exemplified as the first solid electrolyte material used for the first electrolyte layer 101 may be used.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ may be used. In addition, LiX (X: F, Cl, Br, I), $Li_2O$, $MO_q$, $Li_pMO_q$ (M: any of P, Si, Ge, B, Al, Ga, In, Fe, Zn) (p, q: natural number) may be used.

Examples of the oxide solid electrolyte include:

a NASICON solid electrolyte such as $LiTi_2(PO_4)_3$ and its element substitution;

a perovskite solid electrolyte such as $(LaLi)TiO_3$;

a LISICON solid electrolyte such as $Li_{14}ZnGe_4O_{16}$, $Li_4SiO_4$, or $LiGeO_4$ and its element substitution;

a garnet solid electrolyte such as $Li_7La_3Zr_2O_{12}$ and its element substitution;

$Li_3N$ and its H substitution, $Li_3PO_4$ and its N substitution;

glass to which $Li_2SO_4$ or $Li_2CO_3$ has been added using a Li—B—O compound such as $LiBO_2$ or $Li_3BO_3$ as the base thereof; and glass ceramics.

As the polymer solid electrolyte, for example, a compound of a polymer compound and a lithium salt can be used. The polymer compound may have an ethylene oxide structure. Since the solid polymer electrolyte having an ethylene oxide structure can include a large amount of lithium salt, the ionic conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

As the complex hydride solid electrolyte, for example, $LiBH_4$—LiI or $LiBH_4$—$P_2S_5$ can be used.

The thickness of the positive electrode 201 may be not less than 10 μm and not more than 500 μm. If the thickness of the positive electrode 201 is less than 10 μm, it may be difficult to ensure an energy density of the battery sufficiently. In addition, if the thickness of the positive electrode 201 is more than 500 μm, it may be difficult to operate at a high output.

The positive electrode active material may be coated. As the coating material, a material having low electron conductivity can be used. As the coating material, an oxide material or an oxide solid electrolyte can be used.

As the oxide material, for example, $SiO_2$, $Al_2O_3$, $TiO_2$, $B_2O_3$, $Nb_2O_5$, $WO_3$, or $ZrO_2$ can be used.

Examples of the oxide solid electrolyte include:

Li—Nb—O compounds such as $LiNbO_3$;

Li—B—O compounds such as $LiBO_2$ and $Li_3BO_3$;

Li—Al—O compounds such as $LiAlO_2$;

Li—Si—O compounds such as $Li_4SiO_4$;

Li—S—O compounds such as $Li_2SO_4$;

Li—Ti—O compounds such as $Li_4Ti_5O_{12}$;

Li—Zr—O compounds such as $Li_2ZrO_3$;

Li—Mo—O compounds such as $Li_2MoO_3$;

Li-V-O compounds such as $LiV_2O_5$; and

Li—W—O compounds such as $Li_2WO_4$.

The oxide solid electrolyte has high ionic conductivity and high high potential stability. Therefore, the charging/discharging efficiency can be further improved by using the oxide solid electrolyte.

The negative electrode 202 includes a material having a property of storing and releasing metal ions (for example, lithium ions). The negative electrode 202 includes a negative electrode active material, for example.

A metal material, a carbon material, an oxide, a nitride, a tin compound, or a silicon compound can be used as the negative electrode active material. The metal material may be a single metal. Alternatively, the metal material may be an alloy. Examples of the metal material include lithium metal and lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be preferably used.

The negative electrode 202 may include a solid electrolyte material. According to the above configuration, the lithium ion conductivity inside the negative electrode 202 is increased to allow operation at a high output. As the solid electrolyte material, a material that may be included in the positive electrode 201 may be used.

The median diameter of the negative electrode active material particles may be not less than 0.1 μm and not more than 100 μm. If the median diameter of the negative electrode active material particles is less than 0.1 μm, the negative electrode active material particles and the solid electrolyte material are not well dispersed in the negative electrode, so that the charge/discharge characteristic of the battery may be lowered. In addition, if the median diameter of the negative electrode active material particles is more than 100 μm, the lithium diffusion rate in the negative electrode active material particles may be lowered. As a result, it may be difficult to operate the battery at a high output.

The median diameter of the negative electrode active material particles may be larger than the median diameter of the solid electrolyte material. Thereby, the negative electrode active material particles and the solid electrolyte material can be well dispersed.

In the negative electrode 202, a volume ratio Vn representing a volume of the negative electrode active material particles to the total volume of the negative electrode active material particles and the solid electrolyte material may be not less than 0.3 and not more than 0.95. If the volume ratio Vn is less than 0.3, it may be difficult to ensure an energy density of the battery sufficiently. On the other hand, if the volume ratio Vn is more than 0.95, it may be difficult to operate the battery at a high output.

The thickness of the negative electrode 202 may be not less than 10 μm and not more than 500 μm. If the thickness of the negative electrode is less than 10 μm, it may be difficult to ensure an energy density of the battery sufficiently. In addition, if the thickness of the negative electrode is more than 500 μm, it may be difficult to operate at high output.

The first electrolyte layer 101 and the second electrolyte layer 102 may include a sulfide solid electrolyte, an oxide solid electrolyte, a polymer solid electrolyte, and a complex hydride solid electrolyte for the purpose of increasing ion conductivity. As these solid electrolyte materials, materials that may be included in the positive electrode 201 may be used.

At least one of the positive electrode 201, the first electrolyte layer 101, the second electrolyte layer 102, and the negative electrode 202 may include a binder for the purpose of improving adhesion between the particles. The binder is used in order to improve the binding property of the material which forms the electrode.

An example of the material of the binder is poly(vinylidene fluoride), polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose.

As the binder, a copolymer of two or more kinds of materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene can be used. In addition, two or more kinds selected from these may be mixed and used as a binder.

At least one of the positive electrode 201 and the negative electrode 202 may include a conductive agent for the purpose of increasing the electronic conductivity. Examples of the conductive agent include:

graphite such as natural graphite or artificial graphite;
carbon black such as acetylene black or ketjen black;
a conductive fiber such as a carbon fiber or a metal fiber;
carbon fluoride;
metal powder such as aluminum;
conductive whiskers such as zinc oxide or potassium titanate;
a conductive metal oxide such as titanium oxide; and
a conductive polymer compound such as polyaniline, polypyrrole, or polythiophene.

Cost reduction can be achieved by using a carbon conductive agent as the conductive agent.

The positive electrode 201 may include the first solid electrolyte material.

According to the above configuration, the ionic conductivity between the positive electrode 201 and the negative electrode 202 can be further improved.

Figure 2:
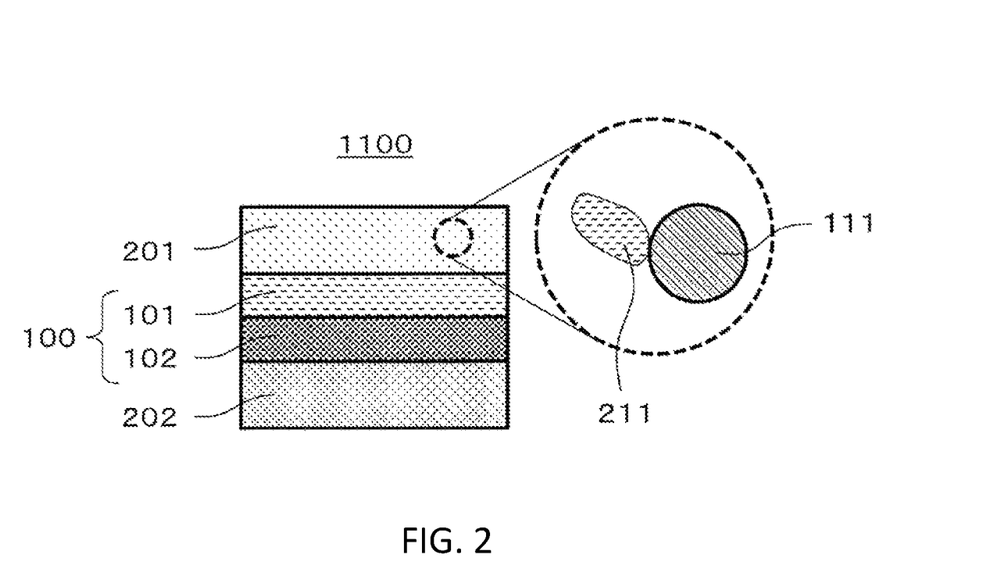
FIG. 2 shows a cross-sectional view of a battery 1100 in the first embodiment.

FIG. 2 shows a cross-sectional view of a battery 1100 in the first embodiment.

In the battery 1100 according to the first embodiment, the positive electrode 201 includes a mixed material of first solid electrolyte particles 111 and the positive electrode active material particles 211.

The first solid electrolyte particles 111 are particles formed of the first solid electrolyte material, or particles including the first solid electrolyte material as a main component (for example, at a weight ratio of not less than 50% (not less than 50 by weight %) with regard to the entire first solid electrolyte particles 111).

In addition, the shape of the first solid electrolyte particles 111 is not limited, and may be, for example, an acicular shape, a spherical shape, or an elliptical spherical shape. For example, the shape of the first solid electrolyte particles 111 may be particulate.

For example, if the shape of the first solid electrolyte particles 111 in the first embodiment is particulate (for example, spherical), the median diameter may be not more than 100 μm. If the median diameter is more than 100 μm, the positive electrode active material particles 211 and the first solid electrolyte particles 111 are not dispersed well in the positive electrode, so that the charge/discharge characteristic of the battery may be lowered. In addition, in the first embodiment, the median diameter of the first solid electrolyte particles 111 may be not more than 10 μm.

According to the above configuration, the positive electrode active material particles 211 and the first solid electrolyte particles 111 can be dispersed well in the positive electrode 201.

In the first embodiment, the median diameter of the first solid electrolyte particles 111 may be smaller than the median diameter of the positive electrode active material particles 211.

According to the above configuration, the first solid electrolyte particles 111 and the positive electrode active material particles 211 can be further dispersed well in the electrode.

The median diameter of the positive electrode active material particles 211 may be not less than 0.1 μm and not more than 100 μm. If the median diameter of the positive electrode active material particles 211 is less than 0.1 μm, the positive electrode active material particles 211 and the first solid electrolyte particles 111 are not dispersed well in the positive electrode 201, and thus the charge/discharge characteristic of the battery may be lowered. In addition, if the median diameter of the positive electrode active material particles 211 is more than 100 μm, lithium diffusion in the positive electrode active material particles 211 is made slow. As a result, it may be difficult to operate the battery at a high output.

The median diameter of the positive electrode active material particles 211 may be larger than the median diameter of the first solid electrolyte particles 111. Thereby, the positive electrode active material particles 211 and the first solid electrolyte particles 111 can be well dispersed.

In addition, the positive electrode 201 may include a plurality of the first solid electrolyte particles 111 and a plurality of the positive electrode active material particles 211.

In addition, in the positive electrode 201, the content of the first solid electrolyte particles 111 may be the same as or different from the content of the positive electrode active material particles 211.

In the positive electrode 201, a volume ratio Vp representing a volume of the positive electrode active material particles 211 to the total volume of the positive electrode active material particles 211 and the first solid electrolyte particles 111 may be not less than 0.3 and not more than 0.95. If the volume ratio Vp is less than 0.3, it may be difficult to ensure an energy density of the battery sufficiently. On the other hand, if the volume ratio Vp is more than 0.95, it may be difficult to operate the battery at a high output.

The battery in the first embodiment can be configured as various types of batteries such as a coin type, a cylindrical type, a prism type, a sheet type, a button type, a flat type, or a stacked type.

(Manufacturing Method of First Solid Electrolyte Material)

The first solid electrolyte material in the first embodiment may be manufactured by the following method, for example.

In consideration of the composition ratio of the product, binary halide raw material powders are prepared. For example, if $Li_3YCl_6$ is produced, LiCl and $YCl_3$ are prepared at a molar ratio of 3:1.

At this time, by selecting the kinds of raw material powders, the elements "M", "Me", and "X" in the above-described composition formula can be determined. In addition, by adjusting the raw material powders, the blending ratio, and the synthesis process, the values of "α", "β", "γ", "d", "δ", "a", "x", and "y" are determined.

Raw material powders are mixed well. Next, the raw material powders are ground using a mechanochemical milling processing method. In this way, the raw material powders react to provide the first solid electrolyte material. Alternatively, the raw material powders are mixed well, and then, sintered in vacuum to provide the first solid electrolyte material.

Thereby, the above-mentioned solid electrolyte material including a crystal phase is provided.

The configuration of the crystal phase (namely, the crystal structure) in a solid electrolyte material can be determined by selecting the reaction method and reaction conditions of the raw material powders.

EXAMPLES

Hereinafter, details of the present disclosure will be described with reference to inventive examples and comparative examples.

Inventive Example 1

[Production of Second Solid Electrolyte Material]

In an argon glove box with a dew point of −60° C. or lower, raw material powders LiCl and $YCl_3$ were prepared at a molar ratio of $LiCl:Cl_3$=3:2. Subsequently, these raw material powders were milled at 600 rpm for 25 hours using a planetary ball mill (manufactured by Fritsch, type P-7) to provide a powder of the second solid electrolyte material $Li_3YCl_6$ according to the inventive example 1.

[Production of First Solid Electrolyte Material]

In an argon glove box with a dew point of −60° C. or lower, raw material powders LiCl, $YCl_3$, and $ZrCl_4$ were prepared at a molar ratio of $LiCl:YCl_3:ZrCl_4$=2.5:0.5:0.5. Subsequently, these raw material powders were milled at 600 rpm for 25 hours using a planetary ball mill (manufactured by Fritsch, type P-7) to provide a powder of the first solid electrolyte material $Li_{2.5}Y_{0.5}Zr_{0.5}Cl_6$ according to the inventive example 1.

[Production of Sulfide Solid Electrolyte Material]

In an argon glove box with a dew point of −60° C. or lower, $Li_2S$ and $P_2S_5$ were prepared at a molar ratio of $Li_2S:P_2S_5$=75:25. These were ground in a mortar and mixed to provide a mixture. Subsequently, the mixture was milled at 510 rpm for 10 hours using a planetary ball mill (Fritsch, P-7 type) to provide a glassy solid electrolyte. The glassy solid electrolyte was heat-treated at 270° C. for 2 hours in an inert atmosphere. Thus, a glass ceramic solid electrolyte $Li_2S$—$P_2S_5$ was provided.

[Preparation of Positive Electrode Material]

In the argon glove box, the first solid electrolyte material $Li_{2.5}Y_{0.5}Zr_{0.5}Cl_6$ according to the inventive example 1 and $LiCoO_2$ (hereinafter, referred to as LCO), which was a positive electrode active material, were prepared at a weight ratio of 30:70. By mixing these in an agate mortar, the positive electrode material of the inventive example 1 was produced.

[Preparation of Negative Electrode Material]

In the argon glove box, the sulfide solid electrolyte material $Li_2S$—$P_2S_5$ and graphite, which was a negative electrode active material, were prepared at a weight ratio of 60:40. By mixing these in an agate mortar, the negative electrode material of the inventive example 1 was produced.

[Production of Secondary Battery]

In an insulating outer cylinder, the negative electrode material according to the inventive example 1 (12 mg), the second solid electrolyte material $Li_3YCl_6$ according to the inventive example 1 (40 mg), the first solid electrolyte material $Li_{2.5}Y_{0.5}Zr_{0.5}Cl_6$ according to the inventive example 1 (40 mg), and the positive electrode material according to the inventive example 1 (10 mg) were stacked in this order. This was press-molded at a pressure of 360 MPa to produce a stacking structure composed of a positive electrode, a first electrolyte layer, a second electrolyte layer, and a negative electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside air atmosphere. In this way, the battery according to the inventive example 1 was produced.

Inventive Example 2

[Production of Second Solid Electrolyte Material]

In an argon glove box with a dew point of −60° C. or less, raw material powders LiBr and $YBr_3$ were prepared at a molar ratio of $LiBr:YBr_3$=3:2. Subsequently, milling was performed at 600 rpm for 25 hours using a planetary ball mill (manufactured by Fritsch, type P-7) to provide a powder of the second solid electrolyte material $Li_3YBr_6$ according to the inventive example 2.

A secondary battery was produced in the same manner as in the inventive example 1, except that the second solid electrolyte material of the inventive example 2 was used for the second electrolyte layer.

Inventive Example 3

[Production of Second Solid Electrolyte Material]

In an argon glove box with a dew point of −60° C. or lower, raw material powders LiBr, LiCl, LiI, YCl$_3$, and YBr$_3$ were prepared at a molar ratio of LiBr:LiCl:LiI:YCl$_3$:YBr$_3$=1:1:4:1:1. Subsequently, milling was performed at 600 rpm for 25 hours using a planetary ball mill (manufactured by Fritsch, type P-7) to provide a powder of the second solid electrolyte material Li$_3$YBr$_2$Cl$_2$I$_2$.

A secondary battery was produced in the same manner as in the inventive example 1, except that the second solid electrolyte material of the inventive example 3 was used for the second electrolyte layer.

Comparative Example 1

[Fabrication of Secondary Battery]

A battery according to the comparative example 1 was produced as below, using the first solid electrolyte material Li$_{2.5}$Y$_{0.5}$Zr$_{0.5}$Cl$_6$ of the inventive example 1, the positive electrode material of the inventive example 1, and the negative electrode material of the inventive example 1.

In an insulating outer cylinder, the negative electrode material of the inventive example 1 (12 mg), the first solid electrolyte material Li$_{2.5}$Y$_{0.5}$Zr$_{0.5}$Cl$_6$ of the inventive example 1 (80 mg), and the positive electrode material of the inventive example 1 (10 mg) were stacked in this order. This was press-molded at a pressure of 360 MPa to produce a stacking structure composed of a positive electrode, an electrolyte layer, and a negative electrode.

Next, stainless steel current collectors were placed on the upper and lower parts of the stacking structure, and current collector leads were attached to the current collectors.

Finally, an insulating ferrule was used to block and seal the inside of the insulating outer cylinder from the outside air atmosphere. In this way, the battery according to the comparative example 1 was produced.

[Charge/Discharge Test]

A charge/discharge test was performed under the following conditions, using each of the batteries of the inventive examples 1 to 3 and the comparative example 1.

The battery was placed in a thermostatic chamber at 25° C.

The battery was charged with a constant current at a current value of 70 μA, which was 0.05 C rate (20 hour rate), with regard to the theoretical capacity of the battery, and the charge was terminated at a voltage of 3.6 V.

Next, the battery was discharged at a current value of 70 μA, which was also 0.05 C rate, and the discharge was terminated at a voltage of 1.9 V.

Thus, the initial charge/discharge efficiency (=initial discharge capacity/initial charge capacity) of each of the batteries of the inventive examples 1 to 3 and the comparative example 1 was provided. The results are shown in Table 1 below.

TABLE 1

| | Electrolyte layer | | Charge/discharge efficiency (%) |
|---|---|---|---|
| | First electrolyte layer | Second electrolyte layer | |
| Inventive Example 1 | Li$_{2.5}$Y$_{0.5}$Zr$_{0.5}$Cl$_6$ | Li$_3$YCl$_6$ | 95.5 |
| Inventive Example 2 | Li$_{2.5}$Y$_{0.5}$Zr$_{0.5}$Cl$_6$ | Li$_3$YBr$_6$ | 97.8 |
| Inventive Example 3 | Li$_{2.5}$Y$_{0.5}$Zr$_{0.5}$Cl$_6$ | Li$_3$YBr$_2$Cl$_2$I$_2$ | 83.6 |
| Comparative Example 1 | Li$_{2.5}$Y$_{0.5}$Zr$_{0.5}$Cl$_6$ | Li$_{2.5}$Y$_{0.5}$Zr$_{0.5}$Cl$_6$ | 67.4 |

[Reduction Potential]

Reduction potentials of typical halides are shown in Table 2 below.

TABLE 2

| Material | Reduction potential V vs. Li/Li$^+$ |
|---|---|
| Li$_3$YCl$_6$ | 0.32 |
| Li$_3$YBr$_6$ | 0.32 |
| Li$_3$YBr$_2$Cl$_2$I$_2$ | 0.27 |
| Li$_{2.5}$Y$_{0.5}$Zr$_{0.5}$Cl$_6$ | 1.37 |

The reduction potential shown in Table 2 was measured by the following method.

In other words, in an insulating outer cylinder, a SUS foil, a halide solid electrolyte material shown in Table 2 (100 mg), and a Li foil were stacked in this order. This was press-molded at a pressure of 360 MPa to produce a stacking structure. Next, stainless steel current collectors were placed on the upper and lower parts of the stacking structure, and current collector leads were attached to the current collectors. Finally, an insulating ferrule was used to block and seal the inside of the insulating outer cylinder from the outside air atmosphere. In this way, a reduction potential measurement cell was produced.

[Reduction Potential Measurement]

Using each of the solid electrolyte materials shown in Table 2, the reduction potential was measured under the following conditions. The reduction potential measurement cell was placed in a thermostatic chamber at 25° C. By cyclic voltammetry measurement, the reduction potential was measured by scanning the potential from −0.5 V to 6 V with regard to a Li reference potential at a rate of 5 mV/s.

Discussion

Figure 3:
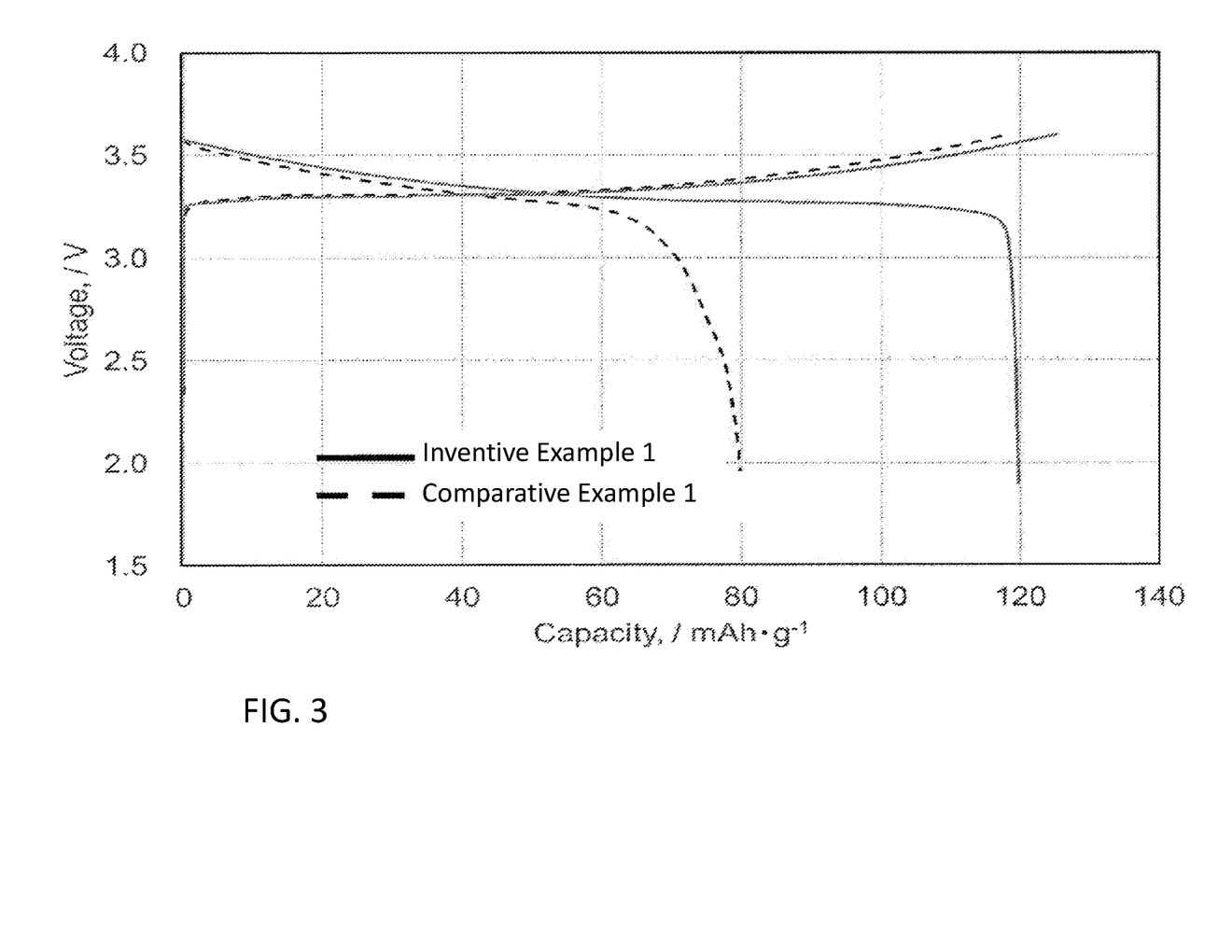
FIG. 3 is a graph showing an initial charge/discharge characteristic of the batteries in the inventive example 1 and the comparative example 1.

FIG. 3 is a graph showing the initial charge/discharge characteristic of the batteries in the inventive example 1 and the comparative example 1.

From the results shown in FIG. 3, Table 1, and Table 2, it is confirmed that, by disposing the solid electrolyte having a low reduction potential with regard to Li on the negative electrode side, the reduction of the first electrolyte layer is suppressed to improve the charging/discharging efficiency.

From the results of the inventive examples 1 to 3 and the comparative example 1 shown in Table 1, a similar effect was confirmed also in the halide solid electrolytes other than Li$_3$YCl$_6$.

INDUSTRIAL APPLICABILITY

The battery of the present disclosure can be used as, for example, an all-solid lithium secondary battery.

REFERENTIAL SIGNS LIST

100 Electrolyte layer
101 First electrolyte layer
102 Second electrolyte layer
111 First solid electrolyte particle
201 Positive electrode
202 Negative electrode
211 Positive electrode active material particle
1000, 1100 Battery

The invention claimed is:

1. A battery, comprising:
a positive electrode;
a negative electrode; and
an electrolyte layer provided between the positive electrode and the negative electrode, wherein:
the electrolyte layer includes a first electrolyte layer and a second electrolyte layer,
the second electrolyte layer is provided between the first electrolyte layer and the negative electrode,
the first electrolyte layer includes a first solid electrolyte material,
the second electrolyte layer includes a second solid electrolyte material different from the first solid electrolyte material,
the first solid electrolyte material is represented by a composition formula $Li_\alpha M_\beta X_6$, where m represents a valence of M, $2.5 \leq \alpha \leq 3$ and $\alpha + m\beta = 6$ are satisfied, and M is at least one selected from the group consisting of Y Mg, Ca, Sr, Ba, Zn, Sc, Al, Ga, Bi, Zr, Hf, Ti, Sn, Ta, and Nb,
X is at least one selected from the group consisting of Cl, Br, and I,
the second solid electrolyte material is represented by a composition formula $Li_3YX'_6$, where X' is at least one selected from the group consisting of Cl, Br, and I, and
a reduction potential with regard to lithium of the second solid electrolyte material is lower than a reduction potential with regard to lithium of the first solid electrolyte material.

2. The battery according to claim 1, wherein M includes yttrium.

3. The battery according to claim 2, wherein the first solid electrolyte material is $Li_{2.5}Y_{0.5}Zr_{0.5}Cl_6$.

4. The battery according to claim 1, wherein the positive electrode includes positive electrode active material particles and particles of the first solid electrolyte material, and the positive electrode active material particles and the particles of the first solid electrolyte material are in contact with each other.

5. The battery according to claim 1, wherein the second solid electrolyte material is
$Li_3YCl_6$;
$Li_3YBr_6$; or
$Li_3YBr_2Cl_2I_2$.

6. A battery, comprising:
a positive electrode;
a negative electrode; and
an electrolyte layer provided between the positive electrode and the negative electrode, wherein:
the electrolyte layer includes a first electrolyte layer and a second electrolyte layer,
the second electrolyte layer is provided between the first electrolyte layer and the negative electrode,
the first electrolyte layer includes a first solid electrolyte material,
the second electrolyte layer includes a second solid electrolyte material different from the first solid electrolyte material,
the first solid electrolyte material is represented by a composition formula $Li_a Me_b Y_c X_6$, where $a+mb+3c=6$, $a>0$, $b \geq 0$ and $c>0$ are satisfied, m represents a valence of Me, and Me is at least one selected from the group consisting of Mg, Ca, Sr, Ba, Zn, Sc, Al, Ga, Bi, Zr, Hf, Ti, Sn, Ta, and Nb,
X is at least one selected from the group consisting of Cl, Br, and I,
the second solid electrolyte material is represented by a composition formula $Li_3M'X'_6$, where:
M' includes at least one selected from the group consisting of Y, Mg, Ca, Sr, Ba, Zn, Sc, Al, Ga, Bi, Zr, Hf, Ti, Sn, Ta, and Nb, and
X' is at least one selected from the group consisting of Cl, Br, and I, and
a reduction potential with regard to lithium of the second solid electrolyte material is lower than a reduction potential with regard to lithium of the first solid electrolyte material.

* * * * *